April 11, 1950     E. P. TURNER ET AL     2,504,094
ROTOR BEARING LUBRICATION STRUCTURE
Filed Jan. 7, 1949     2 Sheets-Sheet 1

Inventors
Edgar P. Turner
Franklin N. Strader
By
William P. Stewart
Attorney

Witness
Godfrey Pecina

April 11, 1950     E. P. TURNER ET AL     2,504,094
ROTOR BEARING LUBRICATION STRUCTURE Filed Jan. 7, 1949     2 Sheets-Sheet 2

Inventor
Edgar P. Turner
Franklin N. Strader
By William P. Stewart
Attorney

Patented Apr. 11, 1950

2,504,094

UNITED STATES PATENT OFFICE 2,504,094

ROTOR BEARING LUBRICATION STRUCTURE

Edgar P. Turner, Fanwood, and Franklin N. Strader, Neshanic, N. J., assignors to The Singer Manufacturing Company, Elizabeth, N. J., a corporation of New Jersey Application January 7, 1949, Serial No. 69,648

9 Claims. (Cl. 308—187)

1

This invention relates to bearing lubrication structure for the rotors of dynamoelectric machines and more particularly of machines in which the structure limits the application of the lubricant from one end only.

In dynamoelectric machines of the type in which the rotor surrounds the stator, sometimes referred to as the "umbrella" type, the bearing support is a stationary hub which projects within the rotor from one end. To provide sufficient stiffness, the rotor shaft is mounted in two spaced-apart bearings. The problem then is to supply lubricant to both bearings from one end of the machine without favoring either bearing due to its nearness to said end.

Prior attempts to solve this problem have led to constructions in which small restricted bores of fixed size have been used to meter the lubricant to the bearings, but these have a tendency to clog during machining and are difficult to clean thoroughly before assembly.

It is an object of this invention, therefore, to provide a lubricating structure for distributing the lubricant equally to two spaced-apart bearings from a common point nearer to one of said bearings.

It is a further object of this invention to provide a lubrication structure which employs a single substantially large bore in conjunction with a special pin therein for the proper feeding of lubricant to two separate bearings.

With the above and other objects in view, as will hereinafter appear, the invention comprises the devices, combinations, and arrangements of parts hereinafter set forth and illustrated in the accompanying drawings of a preferred embodiment of the invention, from which the several features of the invention and the advantages attained thereby will be readily understood by those skilled in the art.

Figure 1:
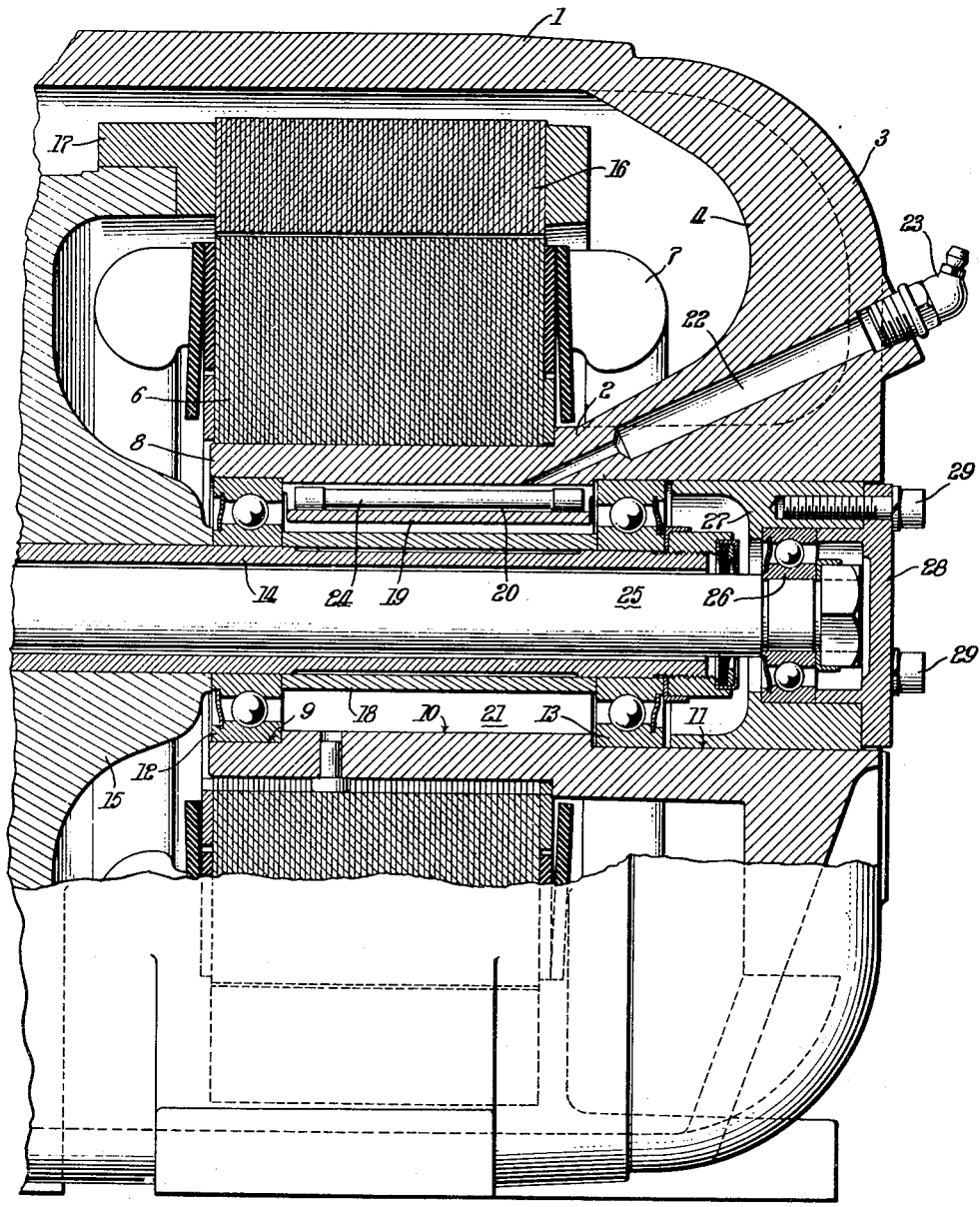
Fig. 1 is a longitudinal section, partly in elevation, taken through a dynamoelectric machine embodying the invention.
Figure 2:
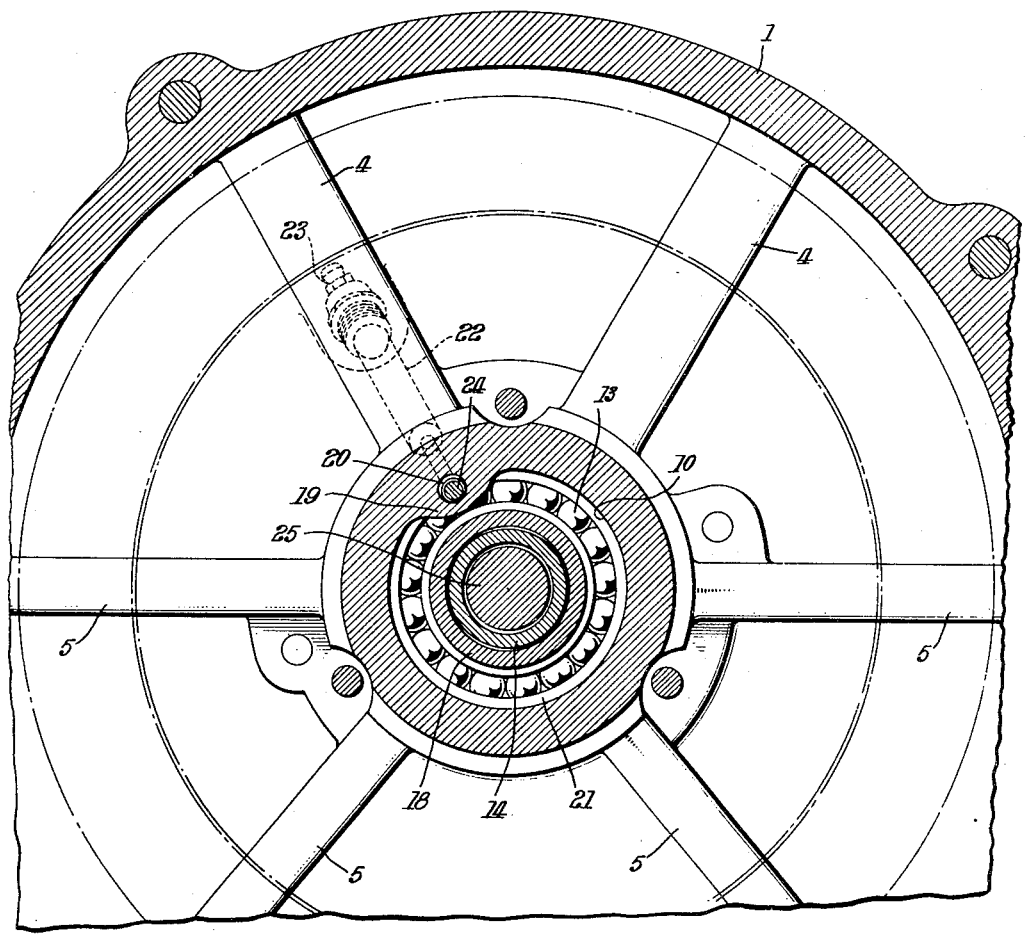
Fig. 2 is a transverse section, partly in elevation, taken on the line 2—2 of Fig. 1.

In Fig. 1 is shown a preferred form of a lubricating system embodying the invention, as applied to a dynamoelectric machine of the type shown and described in the U. S. application of E. P. Turner et al., Serial No. 32,234, filed June 10, 1948, to which reference may be had for a more complete description of the machine itself.

The stator frame comprises an outer annular flange portion 1, connected to a coaxial inner hub 2 by an integral end-bonnet portion 3 containing radial stiffening webs 4 and 5 spaced from each other circumferentially about the machine axis.

A stator core 6 carries a winding 7 and is mounted on an outer stepped portion 8 of the hub 2 which is formed with three axially alined internal bores 9, 10 and 11. The bores 9 and 11 are finished to support the outer race rings of antifriction bearings 12 and 13, respectively. The inner race rings of these bearings 12 and 13 support a hollow shaft 14 to which is affixed a spider 15 carrying at its peripheral rim a rotor core 16 with a cast-in winding 17.

The inner race rings of the bearings 12 and 13 are spaced apart axially by a sleeve 18 which turns with the shaft 14. The central bore 10 is cored and is formed with a thicker wall portion 19 of limited circumferential extent. This wall portion 19 forms, in effect, a radial rib extending inwardly of the bore and longitudinally between the two bearings 12 and 13. A cylindrical bore or duct 20 extends longitudinally through the wall portion 19 from end to end thereof and connects at its ends with the spaces between the outer and inner race rings of the respective bearings and with an annular space 21 between the sleeve spacer 18 and the bore 10.

A bore 22, cut transversely through one of the stiffening webs 4, at an angle inclined to the axis of the shaft 14, connects the bore 20 with the exterior of the stator frame to form a lubricant supply duct, and carries at its outer end, a grease fitting or nipple 23 for reception of a high pressure lubricating coupler or gun such as is commonly employed. Within the bore 20 is positioned a dumbbell-shaped metal rod or pin 24. Grease is fed from the duct 22 to the space between the diametrically enlarged ends of the rod 24 and is metered to each of the bearings 12 and 13 by the reduced clearance at the ends between the rod and the bore.

The pin 24 is slightly shorter than the duct 20 which actually terminates at the outer race rings of the bearings 12 and 13, and this, coupled with the diameter clearance, permits a limited lateral and endwise movement of the pin relative to said duct. Further, the use of the single pin and large bore makes it unnecessary to provide two separate bores of critical small size, thus simplifying the machining problem.

The simple single bore 20 for the metering pin 24 is easy to make and provides a lubricant metering structure which is easy to clean and permits the complete removability of said pin. Further, the relatively large annular space 21 between the bore 10 and the spacer sleeve 18 provides adequate overflow capacity to prevent the leakage of lubricant into the winding-carrying part of the motor due to excess pressure.

A driven shaft 25 is supported at one end by a bearing 26, held in a block 27 which is secured in the bore 11 and provided with a cap 28 fastened to said block by means of screws 29. The bearing 26 receives lubricant by means of a grease fitting (not shown) secured to the cap 28. It will be seen that this construction requires the placing of the bearings 12 and 13 at a substantial distance along the axis from the exterior of the machine and it is important that the lubricant reach both bearings and in approximately equal amounts. This equal distribution of the lubricant is the result of the balanced piston construction for the rod 24.

It will further be seen that the bore 20 lies in a rib portion 19 which is radially within the bearing bores 9 and 11 and is thus readily accessible for flushing out any machining chips and for the insertion of the pin 24 before the bearings 12 and 13 are secured within their bores. Further, any dimensional inaccuracy in finishing the bore 20 need not cause scrapping of the stator member, because the pin 24 can be selected for the proper fit to compensate for the bore inaccuracy.

It will be seen from the above that the invention provides a simple, easy-to-make lubricating structure for properly supplying lubricant to two coaxial and axially spaced bearings from a common single source.

Having thus set forth the nature of the invention, what we claim herein is:

1. A bearing construction comprising two axially alined and spaced-apart antifriction bearings, a duct positioned axially between said bearings in communication with both bearings, single duct means for supplying lubricant to said axial duct, and a pin freely located in said axial duct to allow restricted flow of lubricant from said single duct means to said bearings.

2. In a construction for lubricating two axially alined and spaced-apart antifriction bearings from a single supply duct, a common duct communicating said bearings with and connected centrally to said single supply duct, and a pin having end portions of enlarged diameter, said pin being mounted for limited lateral and endwise movement within said common duct.

3. A bearing construction comprising a stationary member having a central bearing bore, a pair of antifriction bearings secured within said bore in axially spaced-apart relation, a rotary shaft carried by said bearings, a longitudinal duct located eccentrically of said bearing bore in the stationary member in the region between said bearings and providing a communication therebetween, a pin formed with end portions of enlarged diameter and located within said duct to provide therewith restricted passages proximate the ends of said duct, and a single lubricant supply duct communicating from the exterior of said stationary member with said longitudinal duct at a point between said restricted passages.

4. In a bearing construction, a stationary support, a bearing bore formed in said support, a rib portion extending radially into said bore and longitudinally over a part thereof, a duct formed in said rib from end to end thereof, a pair of antifriction bearings mounted with their outer race rings in said bearing bore, and positioned at opposite ends of said rib, a lubricant supplying duct extending from said rib duct to the exterior of said support, and a pin positioned freely in said rib duct and formed with end portions of a shape to provide, with the duct, points of restricted clearance in the rib duct between said lubricant supplying duct and each of the respective bearings.

5. A bearing construction comprising a stationary member formed with a bearing bore, a pair of axially spaced-apart antifriction bearings mounted with their outer race rings secured in said bore, a rotary shaft positioned within said bore and carried by the inner race rings of said bearings, a rib portion extending radially inwardly of the bearing bore in the region between the outer race rings and formed with a duct extending longitudinally from end to end thereof, and a rod located within said duct and formed with end portions of enlarged diameter to form with said duct clearance spaces of predetermined size.

6. In a bearing construction, a stator member formed with a hub portion having a central bearing bore, two axially spaced-apart antifriction bearings seated in said bore, a shaft entering said bearing bore from one end only, a lubricant supply duct in said stator member extending longitudinally of said bearing bore and intermediate said antifriction bearings and having communication at each end with said bearing bore, and a pin freely positioned in said duct and formed with end portions of enlarged diameter to provide, proximate each end of the duct, a clearance space for the restricted passage therethrough of lubricant from said duct to each of said bearings.

7. A supporting structure comprising an outer stationary member and an inner rotatable member, a pair of antifriction bearings having inner bearing races mounted in axially spaced-apart relation on said rotatable member, and outer bearing races mounted in axially spaced-apart bores in said stationary member, a radially-offset, axially-extending duct formed in said stationary member and connecting said spaced-apart bores, a rod positioned in said duct and formed with end portions of enlarged diameter to form, with said duct, reduced clearance spaces, and a lubricant supply duct, formed in said outer stationary member and arranged to connect said duct, in the region between the enlarged ends of the pin, with the exterior of said structure.

8. A bearing structure comprising a stationary hub containing a central bearing bore forming a generally annular ring, a portion of said ring having a thicker wall portion extending radially into said bore and longitudinally along a portion of said ring, a duct extending longitudinally from end to end through said thicker wall portion, a pin located in said duct to provide a lubricant-metering clearance at each end of said duct, a pair of antifriction bearings one of which is positioned in said bore at each of the opposite ends of and in communication with said duct, and a single supply passage in said stationary hub connecting said duct with the exterior of said hub for supplying lubricant from a single point to both bearings.

9. A bearing construction comprising two axially aligned and spaced-apart antifriction bearings, a duct positioned axially between said bearings in communication with both bearings, single duct means for supplying lubricant to said axial duct, and a pin located in said axial duct to form, with said duct, metering restrictions for controlling the flow of lubricant from said single duct means to each of said bearings.

EDGAR P. TURNER.
FRANKLIN N. STRADER.

No references cited.